(12) United States Patent
Nakashima (10) Patent No.: US 10,911,648 B2
(45) Date of Patent: Feb. 2, 2021

(54) IMAGE PICKUP APPARATUS EQUIPPED WITH ELECTRONIC VIEWFINDER

(71) Applicant: CANON KABUSHIKI KAISHA, Tokyo (JP)

(72) Inventor: Shinga Nakashima, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/584,222

(22) Filed: Sep. 26, 2019

(65) Prior Publication Data
US 2020/0106938 A1    Apr. 2, 2020

(30) Foreign Application Priority Data
Sep. 27, 2018 (JP) .................. 2018-182378

(51) Int. Cl.
| | |
|---|---|
| *H04N 5/225* | (2006.01) |
| *H04N 5/232* | (2006.01) |
| *H04N 5/369* | (2011.01) |
| *G01V 8/12* | (2006.01) |
| *G03B 13/02* | (2006.01) |

(52) U.S. Cl.
CPC ......... *H04N 5/225251* (2018.08); *G01V 8/12* (2013.01); *H04N 5/23293* (2013.01)

(58) Field of Classification Search
CPC .... H04N 5/225; H04N 5/2251; H04N 5/2252; H04N 5/23293; H04N 5/23245; H04N 5/369; G03B 13/02; G06F 2200/1614; G01V 8/12

USPC ...... 396/84, 94; 348/333.06, 333.01, 333.02, 348/333.09, 333.04, 333.07, 341, 345
See application file for complete search history.

(56) References Cited

U.S. PATENT DOCUMENTS

| | | | | |
|---|---|---|---|---|
| 8,040,420 B2* | 10/2011 | Horie | ...... | H04N 5/222 348/333.01 |
| 8,416,333 B2* | 4/2013 | Nakai | ...... | H04N 5/222 348/333.06 |
| 10,091,427 B2* | 10/2018 | Sato | ...... | H04N 5/2251 348/333.01 |
| 10,136,068 B2* | 11/2018 | Sato | ...... | H04N 5/2251 348/333.01 |
| 10,257,425 B2* | 4/2019 | Nakagawara | ...... | H04N 5/23293 348/333.06 |
| 10,649,313 B2* | 5/2020 | Ota | ...... | H04N 5/23245 348/333.01 |

(Continued)

FOREIGN PATENT DOCUMENTS

JP    2015-227901 A    12/2015

*Primary Examiner* — Marly S Camargo
(74) *Attorney, Agent, or Firm* — Cowan, Liebowitz & Latman, P.C.

(57) ABSTRACT

An image pickup apparatus capable of being downsized even when provided with an eye detection sensor when the apparatus includes an electronic viewfinder. The image pickup apparatus includes an electronic viewfinder for viewing an image through an eyepiece and a display unit provided with a display on which the image is displayed. The eye detection sensor detects whether an eye of a photographer approaches the electronic viewfinder. The electronic viewfinder and the display are controlled selectively according to an eye detection result by the eye detection sensor. The eye detection sensor is disposed on the display unit.

4 Claims, 5 Drawing Sheets

(56) References Cited

U.S. PATENT DOCUMENTS

| | | | | |
|---|---|---|---|---|
| 2009/0262211 A1* | 10/2009 | Mori | .................... | H04N 5/2251 |
| | | | | 348/333.01 |
| 2010/0066888 A1* | 3/2010 | Nakai | .................... | H04N 5/222 |
| | | | | 348/333.01 |
| 2011/0050974 A1* | 3/2011 | Nakai | .................... | H04N 5/225 |
| | | | | 348/333.01 |
| 2011/0167526 A1* | 7/2011 | Ishihara | ................ | H04N 5/222 |
| | | | | 348/333.01 |
| 2011/0310285 A1* | 12/2011 | Nakai | .................... | H04N 5/222 |
| | | | | 348/333.06 |
| 2017/0045802 A1* | 2/2017 | Sato | .................. | H04N 5/23293 |
| | | | | 348/372 |

* cited by examiner

IMAGE PICKUP APPARATUS EQUIPPED WITH ELECTRONIC VIEWFINDER

BACKGROUND OF THE INVENTION

Field of the Invention

The present invention relates to an image pickup apparatus equipped with an electronic viewfinder such as a digital camera.

Description of the Related Art

In general, it is known that image pickup apparatuses such as digital cameras or video cameras are equipped with an electronic viewfinder that displays an image with a display device such as an organic EL display panel. In such an image pickup apparatus, for purpose of enhancing operability, it switches a display media to either a liquid crystal display panel on the rear surface of the image pickup apparatus or an electronic viewfinder according to movements of a photographer (for example, according to an eyepiece approach).

For this reason, to detect an eye approach of a photographer, some image pickup apparatuses are equipped with an eyepiece detection sensor that emits infrared light and detects the infrared light reflected from an object such as a photographer who has approached an electronic viewfinder. When the eyepiece detection sensor detects an approach of the object, displays are switched to avoid troublesome operations such as button operation.

It is known, for example, a camera provided with an electronic viewfinder (EVF) capable of being popped up and an eyepiece detection sensor disposed close to the EVF (see, for example, Japanese Laid-Open Patent Publication (kokai) No. 2015-227901). In Japanese Laid-Open Patent Publication (kokai) No. 2015-227901, a pop-up mechanism is provided with a detection switch which detects whether the EVF is stored or popped up and which turns on or off the eyepiece detection sensor depending on the state of the EVF. When the EVF is stored, the eyepiece detection sensor is turned off.

In addition, in Japanese Laid-Open Patent Publication (kokai) No. 2015-227901, the eyepiece detection sensor is attached to a camera body so as to minimize the size of the EVF in a pop-up motion.

However, if an eyepiece detection sensor is disposed on a camera body as in Japanese Laid-Open Patent Publication (kokai) No. 2015-227901, it is often the case that a liquid crystal display panel covers most part of the rear surface of a camera where the eyepiece detection sensor is disposed. For this reason, it is required to reliably make space for mounting an eyepiece detection sensor and peripheral components by, for example, providing steps.

If an eyepiece detection sensor is disposed in an EVF unit, the EVF unit may increase in size, which restricts a pop-up mechanism.

SUMMARY OF THE INVENTION

The present invention provides an image pickup apparatus which enables being downsized even when provided with an eye detection sensor when the apparatus includes an electronic viewfinder.

Accordingly, the present invention provides an image pickup apparatus including an electronic viewfinder for viewing an image through an eyepiece and a display unit provided with a display on which the image is displayed, the image pickup apparatus comprising an eyepiece detection sensor configured to detect whether an eye approaches the electronic viewfinder, and at least one processor and/or a circuit configured to function as a control unit that selectively controls the electronic viewfinder and the display according to an eye detection result by the eyepiece detection sensor, wherein the eyepiece detection sensor is disposed on the display unit.

According to the present invention, it enables to downsize an image pickup apparatus even when the apparatus is provided with an eyepiece detection sensor when the apparatus includes an electronic viewfinder.

Further features of the present invention will become apparent from the following description of exemplary embodiments (with reference to the attached drawings).

DESCRIPTION OF THE EMBODIMENTS

Hereinafter, an example of an image pickup apparatus according to the present invention will be described with reference to the drawings.

Figure 1A:
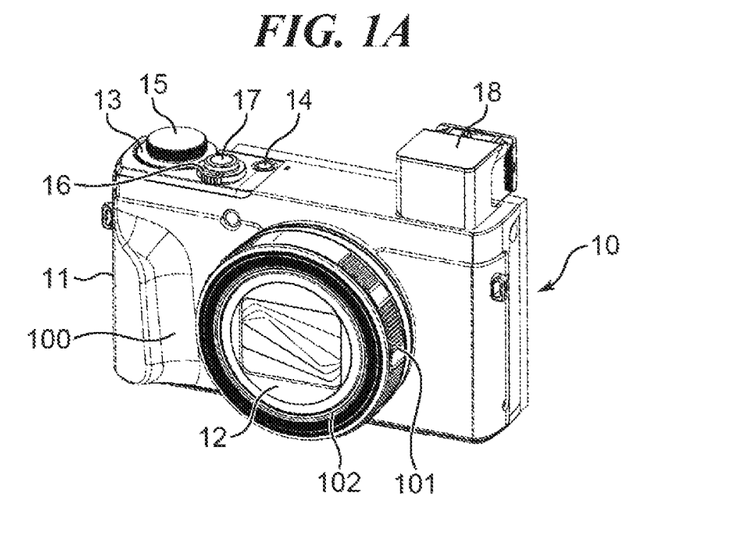
FIGS. 1A and 1B are perspective views showing an example of an image pickup apparatus according to an embodiment of the present invention.
Figure 1B:
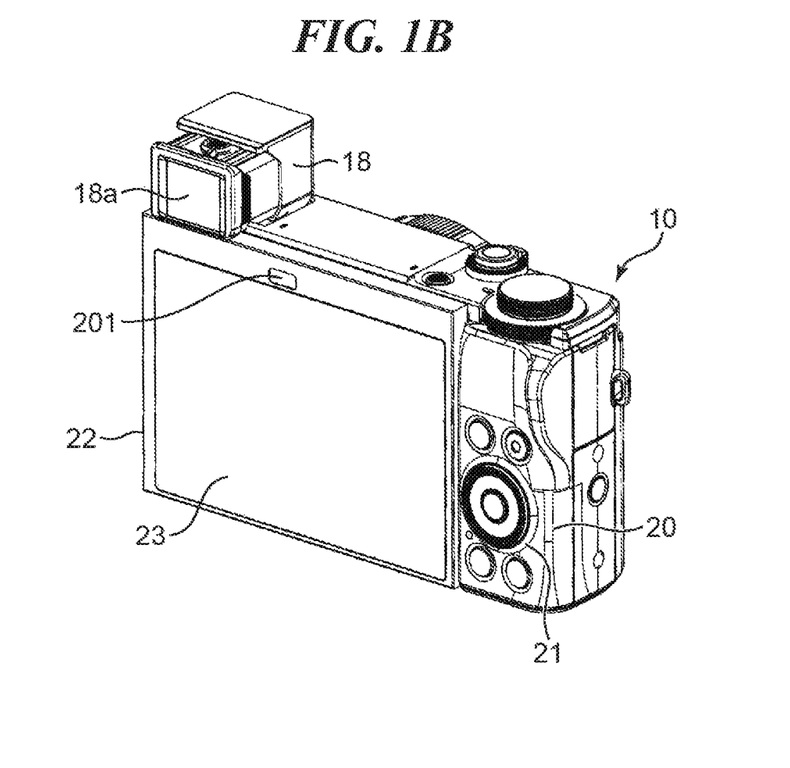

FIGS. 1A and 1B are perspective views showing an example of an image pickup apparatus according to an embodiment of the present invention. FIG. 1A is a front perspective view showing the apparatus, and FIG. 1B is a rear perspective view showing the apparatus.

The image pickup apparatus shown in FIGS. 1A and 1B is, for example, a digital camera (hereinafter simply referred to as "camera") 10 provided with a front cover unit 11 on the front surface. The front cover unit 11 is provided with a lens barrel 12. Through the lens barrel 12, an optical image is formed on an image pickup sensor (not shown) included in the camera 10.

A control ring 101 controlled in a rotatable manner is disposed on the outer periphery of the lens barrel 12. A hollow portion is disposed all around the outer periphery of the cylindrical lens barrel 12, and the control ring 101 is disposed in the hollow portion. The control ring 101 is held by the lens barrel 12, being interposed between a fixing member 102 and a front cover 100.

A photographer may assign arbitrary functions to the control ring 101 to change shooting conditions. For example, a photographer may rotate the control ring 101 to change shooting conditions such as focal position and exposure value.

The camera 10 has a top surface provided with an exposure dial 13 for changing exposure value. In addition, the top surface is provided with a power button 14 for switching between the operating state and the non-operating state of the camera 10 and is provided with a mode dial 15 for switching various shooting modes.

When a photographer presses the power button 14 while the camera 10 is in the non-operating state, the camera 10 is switched to the operating state. Then, a retractable lens barrel section in the lens barrel 12 is drawn out and protrudes outward from a camera body so as to be ready for shooting. On the other hand, when a photographer presses the power button 14 while the camera 10 is in the operating state, the retractable lens barrel section is retracted and stored in the camera body, which puts the camera 10 in the non-operating state.

When the mode dial 15 is turned while the camera 10 is in the operating state, the shooting modes are switched. Examples of the shooting modes include a manual shooting mode that allows a photographer to set shooting conditions such as shutter speed and aperture, an automatic shooting mode that automatically offers appropriate exposure, and a moving-shooting mode.

Furthermore, the top surface of the camera 10 is provided with a zoom lever 16 for changing focal lengths of the lens barrel 12 and a release button 17 for shooting.

The top surface of the camera 10 has an end provided with an EVF unit 18 including an electronic viewfinder that performs various kinds of displays using display devices such as an organic EL display panel. When the EVF unit 18 is not in use, the EVF unit 18 may be pushed in and stored in the camera 10. The rear surface of the EVF unit 18 is provided with an eyepiece 18a for looking through a display surface of the electronic viewfinder.

The camera 10 includes a rear surface cover unit 20 on the rear surface. A rear operation unit 21 and a display unit 22 are disposed in the rear surface cover unit 20. Various functions are assigned to the rear operation unit 21. In addition, the display unit 22 includes a liquid crystal display (display) 23 for displaying an image. A hinge mechanism 300 to be described later enables the display 23 to operate while the display 23 is tilted.

When the camera 10 is in the operating state, a real time image related to an object is displayed on the display 23 or the EVF unit 18. Furthermore, various shooting parameters such as shutter speed and aperture are displayed on the display 23 or the EVF unit 18. Then, a photographer controls the rear operation unit 21 to change setting values relating to a shooting parameter.

It should be noted that the rear operation unit 21 is provided with a display button for instructing to playback images. With operation of the display button, the image data obtained by shooting is displayed on the display 23 or the EVF unit 18.

The display 23 is provided, on the upper surface, with a sensor protective plate 201 covering an eyepiece detection sensor 200 to be described later. When a photographer's eye gets close to the eyepiece 18a to visually check the display of the EVF unit 18, depending on outputs of the eyepiece detection sensor 200, it is determined whether an eye approaches the EVF unit 18.

Figure 2:
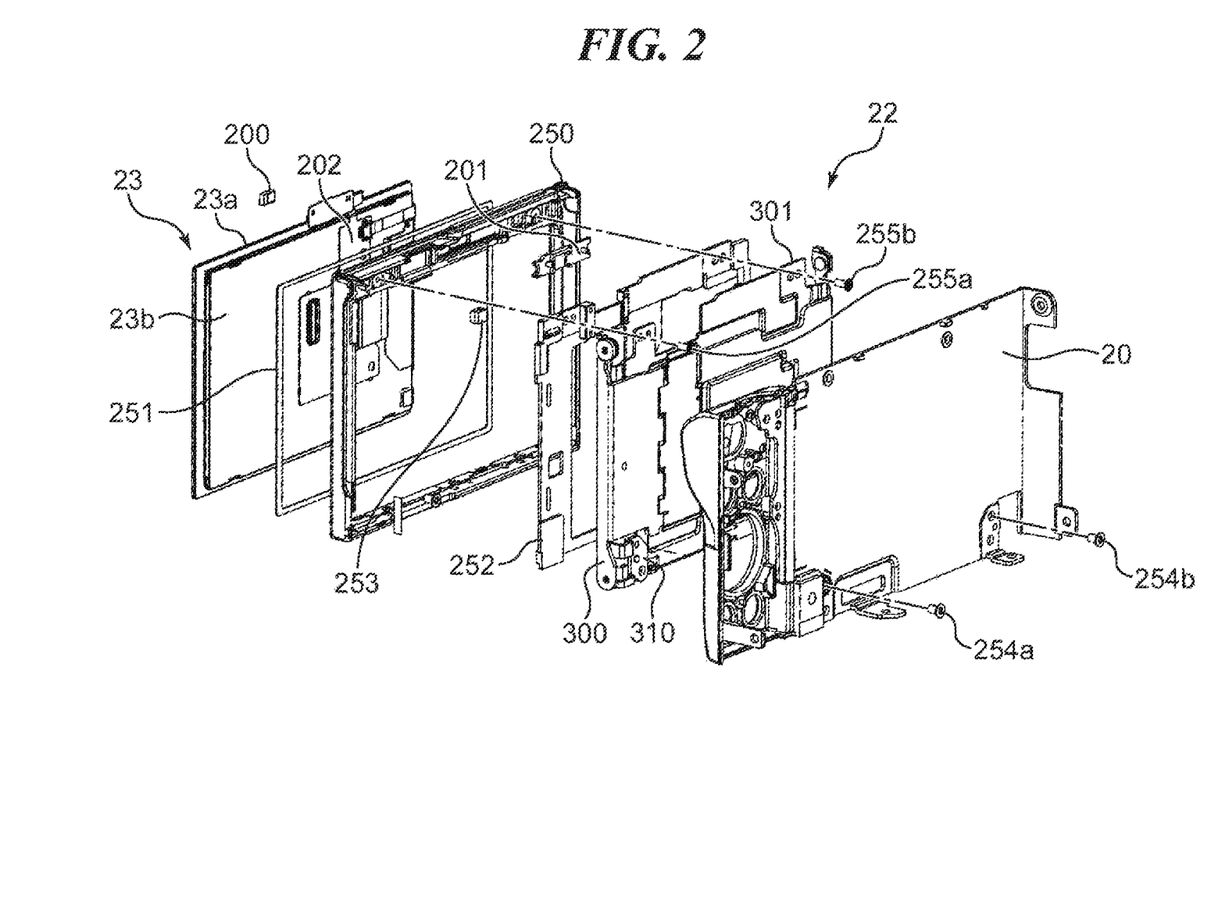
FIG. 2 is an exploded perspective view showing an arrangement of a display unit shown in FIG. 1B.

FIG. 2 is an exploded perspective view showing an arrangement of the display unit shown in FIG. 1B.

The display 23 includes a protective window 23a, a touch panel (not shown), a display panel (not shown), and a bezel 23b obtained by sheet-metal forming. The touch panel is, for example, a capacitive touch panel.

The protective window 23a is a panel that protects the display panel and the touch panel from damages, dirt, and the like, and is typically made of tempered glass with a thickness of about 0.5 to 1.0 mm. It should be noted that a material of the protective window 23a may be, for example, transparent resin such as acrylic resin and polycarbonate having high light transmittance. The protective window 23a is larger than the display panel and protects the entire display panel.

As described earlier, the touch panel is of the capacitive type, and wires are made of indium tin oxide (ITO), one of the transparent conducting films. The touch panel may be a plastic substrate as long as it is transparent and capable of resisting temperatures, for example, in annealing of ITO, although a touch panel is made of glass in general. Examples of the transparent resin include acrylic and polycarbonate.

The bezel 23b is formed by bending a metallic plate such as stainless steel and is placed on the opposite side of the display surface.

The display 23 is bonded to an exterior cover 250 by a double-sided tape 251 having a hollow square shape along the outline of the protective window 23a. The exterior cover 250 is an external component which is molded by resin such as polycarbonate and which covers the periphery of the display 23. A surface of the exterior cover 250 is painted or subjected to be emboss-processed.

It is desirable that the double-sided tape 251 having a hollow square shape should have a high adhesive strength and shock resistance. In other words, the double-sided tape 251 is used to prevent the display 23 from being loose and peeled from the exterior cover 250 due to a shock such as falling, and also, to prevent the display 23 from being cracked when jumping out of the exterior cover 250. In addition, the double-sided tape 251 prevents disconnection of a flexible printed board connected to the display panel due to loosening of the display 23 and prevents breakage of connectors.

A display board 202 electrically controls the display 23, and most part of the display board 202 is disposed on the bezel 23b placed on the rear surface of the display 23. The display board 202 is attached and fixed to the bezel 23b with a double-sided tape (not shown). The display board 202 is connected by a flexible board (not shown) to another board (not shown) disposed in the camera 10.

To the display board 202, the eyepiece detection sensor 200 including an infrared emission unit and an infrared reception unit is fixed by solder. The eyepiece detection sensor 200 constantly emits infrared light from the infrared emission unit. When an object approaches the eyepiece detection sensor 200, the infrared light reflected by the object is received by the infrared reception unit. Accordingly, for example, when a photographer's eye gets close to the eyepiece 18a shown in FIG. 1B, the eyepiece detection sensor 200 detects the photographer (for example, the face of the photographer).

An eye detection signal indicating an eye detection result by the eyepiece detection sensor 200 is sent to the aforementioned other board (for example, a control unit) through the display board 202 and the flexible board. Then, the control unit controls the electronic viewfinder according to the eye detection signal.

When the eye detection signal indicates an approach of an eye, the control unit turns the power on of the electronic viewfinder in the EVF unit 18. On the other hand, when the eye detection signal does not indicate an approach of an eye, the control unit determines that the electronic viewfinder is not in use and turns the power off of the electronic viewfinder.

The on-off state of the electronic viewfinder is synchronized with the on-off state of the display 23. In other words, when the electronic viewfinder is turned on, the control unit turns off the display 23. On the other hand, when the electronic viewfinder is turned off, the control unit turns on the display 23.

As described above, depending on eye detection results by the eyepiece detection sensor 200, the control unit selectively controls the electronic viewfinder and the display 23.

The sensor protective plate 201 for protecting the eyepiece detection sensor 200 is disposed on the front surface of the eyepiece detection sensor 200. The sensor protective plate 201 is engaged with a through hole included in the exterior cover 250 and is fixed to the exterior cover 250 with an adhesive or the like. Furthermore, in order to prevent the eyepiece detection sensor 200 from erroneously detecting an approach of an eye due to infrared light being reflected by the sensor protective plate 201, the sensor protective plate 201 is formed of a material that easily transmits infrared light.

A rear surface cover 252 is disposed on the rear surface of the display 23 and formed of a resin material, functioning as a light shielding cover that blocks out light. The rear surface cover 252 blocks out light that leaks backward from the display 23. The rear surface cover 252 is assembled to the display 23 from a direction opposite to a direction in which the exterior cover 250 is assembled to the display 23. Namely, the rear surface cover 252 is fixed to the display 23 being interposed between the exterior cover 250 and the hinge mechanism 300.

A magnet 253 is stored in a part of the exterior cover 250 and fixed with an adhesive or the like. The magnet 253 is a member that generates a magnetic field. Magnetic flux of the magnet 253 is detected by a magnetic sensor (not shown) disposed in the camera 10. As described later, depending on magnetic detection results by the magnetic sensor, when the display unit 22 is rotated by the hinge mechanism 300, a display screen of the display 23 is switched to another.

A giant magneto-resistive (GMR) device or a semiconductor Hall device, for example, is used to form the magnetic sensor. The GMR device detects a magnetic field parallel to a main surface, using a magneto-resistive effect. Examples of the GMR device include alloys having such a property that electric resistance increases with an increase in strength of the magnetic field (for example, an alloy containing nickel, iron, and cobalt as main components). This GMR device is incorporated into a determination circuit and included in a GMR sensor.

In the FIG. 2 for example, a threshold is set for the GMR device, and the GMR sensor detects magnetic fields that change depending on positions of the magnet 253. In response to whether a magnetic field detection result exceeds the threshold, the display screen of the display 23 is left-right inverted or top-bottom inverted.

The display unit 22 is rotatable by the hinge mechanism 300 from the closed state shown in FIG. 1B to 180 degrees. When the display unit 22 is detected to be rotated at a predetermined angle or more, the display screen of the display 23 is left-right inverted or top-bottom inverted from the normal state. Furthermore, the display screen keeps inversion until the display screen transits to the state of 180 degrees from a detection angle equal to or more than the predetermined angle. In this state, a shooting direction of a shooting optical system and a direction of the display screen are the same. Accordingly, this state is suitable for shooting what is called selfies or shooting a photographer himself/herself.

The hinge mechanism 300 includes stand plates 310 and 311. The stand plates 310 and 311 are fastened and fixed to the rear surface cover unit 20 with screws 254a and 254b. The hinge mechanism 300 also includes an arm plate 301 which is fixed to the exterior cover 250 with screws 255a and 255b with a part of the rear surface cover 252 being interposed between the arm plate 301 and the exterior cover 250.

As described above, the display unit 22 is fixed to the camera body through the rear surface cover 252.

Figure 3:
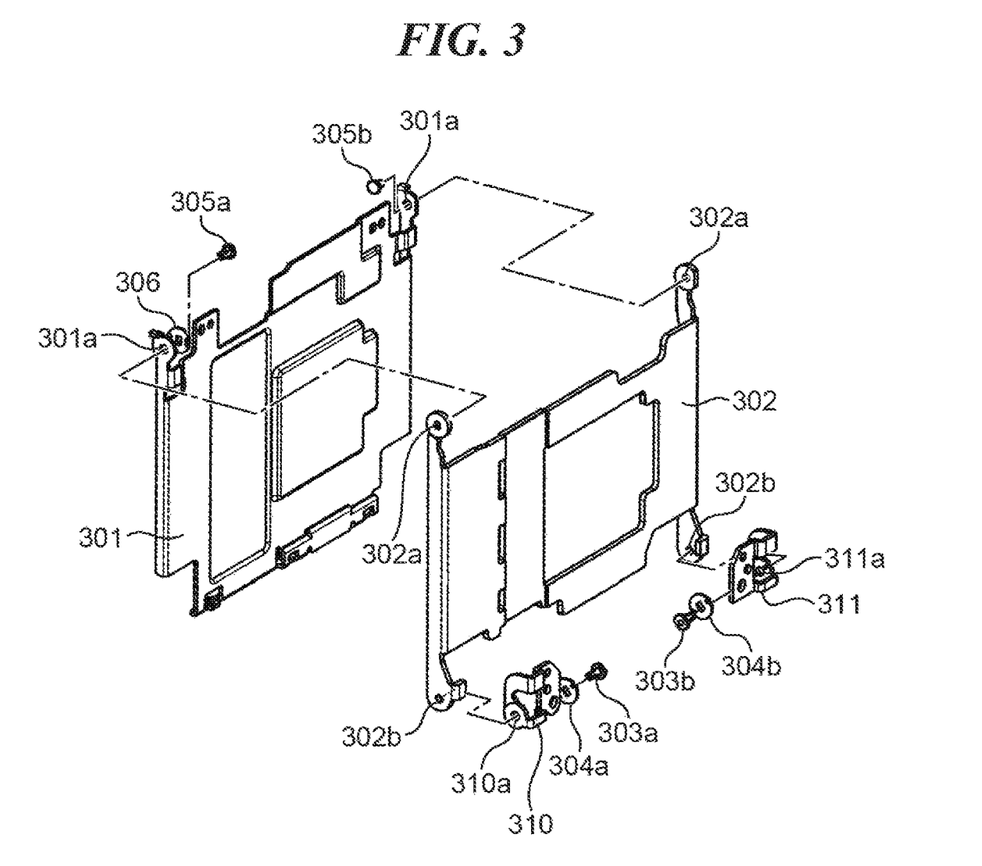
FIG. 3 is an exploded perspective view showing a hinge mechanism shown in FIG. 2.

FIG. 3 is an exploded perspective view showing the hinge mechanism shown in FIG. 2.

On a base plate 302, a hinge rotation axis arranged on the upper surface of the camera 10 is regarded as "rotation axis A" (rotation axis 302a), and a hinge rotation axis arranged on the lower surface of the camera 10 is regarded as "rotation axis B" (rotation axis 302b). The stand plates 310 and 311 include right and left upright walls respectively provided with rotation axis holes 310a and 311a which are arranged coaxially with the rotation axis 302b.

The arm plate 301 has an upright wall provided with a rotation axis hole 301a which is arranged coaxially with the rotation axis 302a. Together with the stand plates 310 and 311 and click plates 304a and 304b, supporting pins 303a and 303b are inserted into the rotation axis 302b and crimp-fixed thereto.

Accordingly, the base plate 302 is connected to the stand plates 310 and 311 in a rotatable manner. The base plate 302 is held by friction at any rotational position as a result of receiving frictional resistance from rotation of the click plates 304a and 304b.

Together with a click plate 306, supporting pins 305a and 305b are inserted into the arm plate 301 and the rotation axis 302a and are crimp-fixed thereto. Accordingly, the arm plate 301 is connected to the base plate 302 in a rotatable manner. The arm plate 301 is held by friction at any rotational position as a result of receiving frictional resistance from rotation of the click plate 306.

Press-formed metallic materials including the base plate 302, the arm plate 301, and the stand plates 310 and 311 are components with high strength with respect to rotational motion.

The display unit 22, as described earlier, is attached to the camera 10 by the hinge mechanism 300 in a vertically rotatable manner.

Figure 4A:
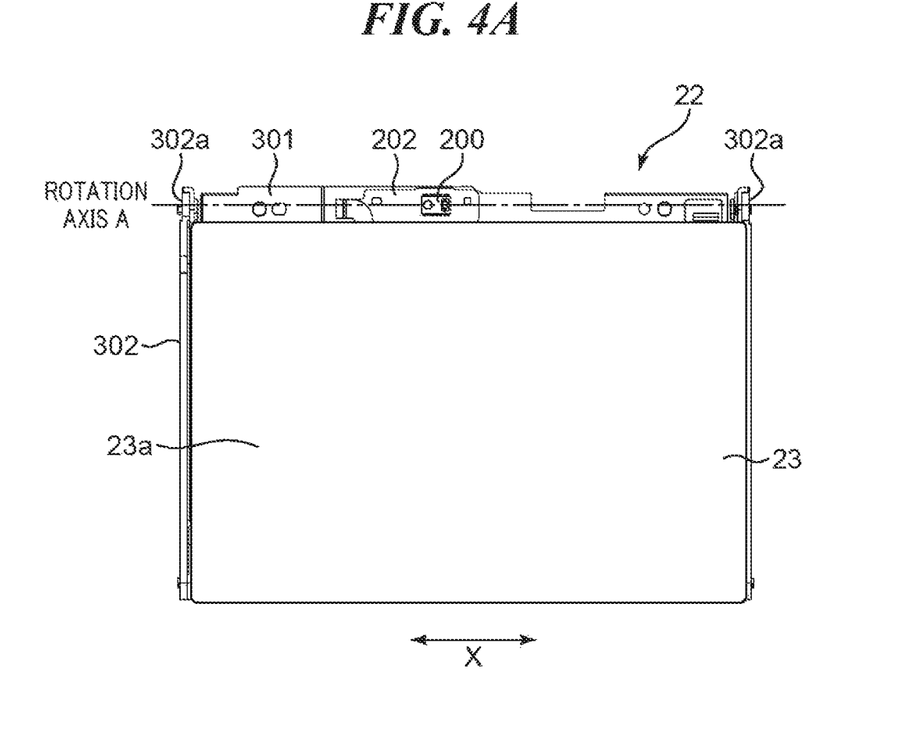
FIGS. 4A and 4B are diagrams illustrating an arrangement of a display unit shown in FIG. 2.
Figure 4B:
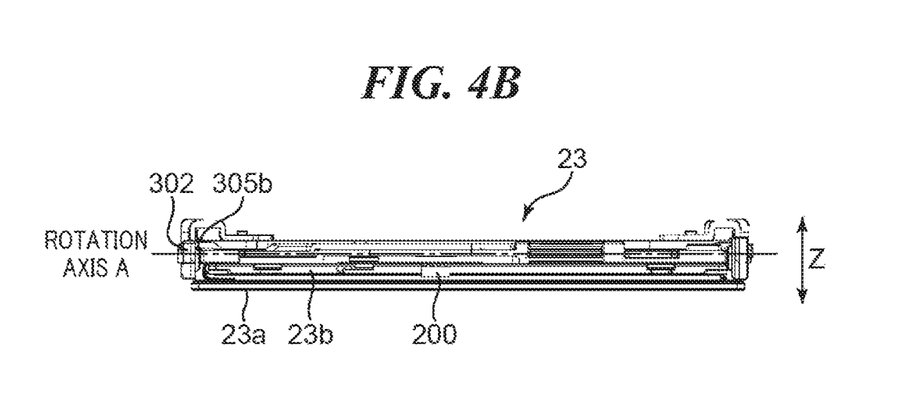

FIGS. 4A and 4B are views illustrating an arrangement of the display unit shown in FIG. 2. FIG. 4A is a diagram showing a back view of the display unit, and FIG. 4B is a diagram showing a upper view of the display unit.

FIGS. 4A and 4B show arrangements of the display 23, the hinge mechanism 300, and the eyepiece detection sensor 200. As shown in FIG. 4A, the rotation axis 302a of the hinge mechanism 300 is specified by the shape of a peripheral part of the rotation axis hole 301a, the click plate 306, and the supporting pins 305a and 305b as described earlier. The rotation axis 302a is arranged on an upper surface of the display 23 and specified by peripheral parts of both sides of the bezel 23b on a side close to the bezel 23b with respect to the protective window 23a of the display 23, that is, on a side opposing the display surface of the display 23.

Arranging the rotation axis 302a on the upper surface (upper side) of the protective window 23a enables minimization of elements that specify the size in the X direction shown in FIG. 4A or in a longitudinal direction of the display 23. Accordingly, it enables to minimize the size of the display unit 22 in the X direction.

Arranging the rotation axis 302a on the side close to the bezel 23b with respect to the protective window 23a included in the display 23 and around both sides of the bezel 23b enables the rotation axis 302a to be arranged within a thickness in the Z direction of the display 23 as shown in FIG. 4B.

Accordingly, it enables to minimize the display unit 22 in a thickness direction (the Z direction).

In the display unit 22, the eyepiece detection sensor 200 is disposed on the upper surface of the display 23. As described earlier, the rotation axis 302a is arranged on the upper surface of the display 23, and both ends of the display 23 are provided with the elements that specify the rotation axis 302a of the hinge mechanism 300. For this reason, the eyepiece detection sensor 200 placed on the upper surface of the display 23 is disposed on the rotation axis 302a.

This arrangement makes that the eyepiece detection sensor 200 is disposed within a space where the elements specifying the rotation axis 302a of the hinge mechanism 300 are placed, therefore, the arrangement of the eyepiece detection sensor 200 does not upsize the display unit 22.

Furthermore, since the eyepiece detection sensor 200 is disposed in the display unit 22, it is not required to dispose the eyepiece detection sensor 200 within the camera body.

In addition, a detecting direction of the eyepiece detection sensor 200 is a direction orthogonal to (intersecting with) the display surface of the display 23, thus, it enables to minimize a thickness of the display unit 22.

Figure 5:
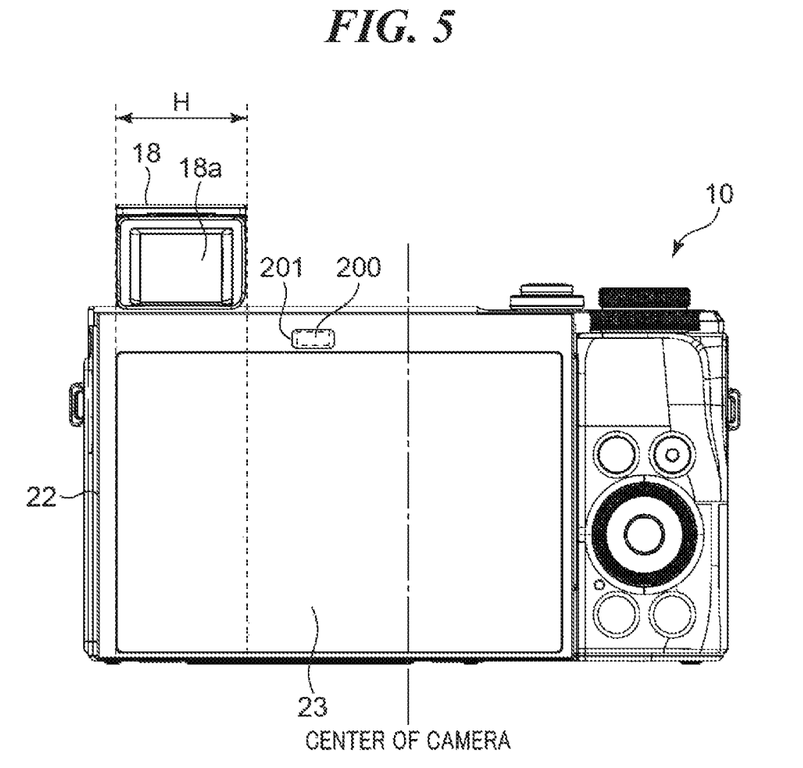
FIG. 5 is a diagram illustrating an arrangement of an eyepiece detection sensor on a camera shown in FIG. 4A.

FIG. 5 is a diagram illustrating an arrangement, in the camera, of the eyepiece detection sensor shown in FIG. 4A, and is also a diagram showing a back view of the camera.

In FIG. 5, the EVF unit 18 is disposed within a width H in the camera 10. The eyepiece detection sensor 200 disposed at the inner side of the sensor protective plate 201 included in the display unit 22 is disposed outside of a range specified by the width H of the EVF unit 18.

As described above, the hinge mechanism 300 rotates the display unit 22 in which the eyepiece detection sensor 200 is mounted. Since the eyepiece detection sensor 200 is disposed outside of the range specified by the width H, when the display unit 22 is rotated, the eyepiece detection sensor 200 does not detect the EVF unit 18 popped up from the camera 10.

As described above, since the eyepiece detection sensor 200 detects an object by infrared light, the eyepiece detection sensor 200 may detect not only a person but also components included in the camera 10. Being disposed outside of the range specified by the width H (that is, a position deviated from the detectable range) as shown in FIG. 5, the eyepiece detection sensor 200 does not operate erroneously. In other words, when a photographer rotates the display unit 22 while checking an image displayed on the display 23, the eyepiece detection sensor 200 does not detect the EVF unit 18. Therefore, it prevents the display of an image from being switched from the display 23 to the electronic viewfinder when a photographer does not wish to visually check the electronic viewfinder.

When shooting with the camera 10, a photographer checks an image through the display 23 or the electronic viewfinder. When checking the image through the electronic viewfinder, the photographer brings his/her eye close to the eyepiece 18a. At this time, when the eye of the photographer comes within a distance equal to or less than a predetermined distance from the eyepiece 18a, depending on eye detection results by the eyepiece detection sensor 200, the display of an image is switched from the display 23 to the electronic viewfinder.

For this reason, if the eyepiece detection sensor 200 is separated from the EVF unit 18, even when a photographer brings his/her eye close to the eyepiece 18a, the eyepiece detection sensor 200 does not detect the face of the photographer. Accordingly, it is preferable that the eyepiece detection sensor 200 is not too far from the EVF unit 18. Therefore, in the example shown in FIG. 5, the eyepiece detection sensor 200 is disposed outside the range specified by the width H where the EVF unit 18 is disposed and also between the EVF unit 18 and the center of the camera.

In the embodiment, the eyepiece 18a is fixed to the rear surface of the camera, but the present invention is not limited to this arrangement. For example, the eyepiece 18a may be operable while being tilted. This arrangement, even when the camera 10 is held at a low position for shooting from a low angle, enables to enhance operability when using the electronic viewfinder.

Provided that the lens barrel 12 is facing an object in front of a photographer, that the display unit 22 is operating, that the display surface of the display 23 is rotated upward, and that the eyepiece 18a is rotated upward. Furthermore, provided that the photographer looks through the eyepiece 18a after checking the display 23 from above to determine the composition.

At this time, with the upward rotation of the display unit 22, the detecting direction of the eyepiece detection sensor 200 matches the orientation of the display 23, that is, the upward direction. When the photographer looks through the eyepiece 18a rotated upward, the display of an image is switched from the display 23 to the electronic viewfinder.

As described above, in the embodiment of the present invention, since the eyepiece detection sensor 200 is mounted on the display unit 22, an arrangement (structure) for mounting the eyepiece detection sensor on the camera body is unnecessary. Furthermore, since the eyepiece detection sensor is disposed on the rotation axis for rotating the display unit 22, the display unit 22 is not upsized. Accordingly, the camera itself does not increase in size.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-182378, filed Sep. 27, 2018, which is hereby incorporated by reference herein in its entirety.

What is claimed is:

1. An image pickup apparatus including an electronic viewfinder for viewing an image through an eyepiece and a display unit provided with a display on which the image is displayed, the image pickup apparatus comprising:
   an eyepiece detection sensor configured to detect a face of a user and determine whether an eye of the user approaches the electronic viewfinder;
   at least one processor and/or a circuit configured to function as a control unit that selectively controls the electronic viewfinder and the display according to an eye detection result by the eyepiece detection sensor; and
   a hinge mechanism configured to support the display in a rotatable manner with respect to the image pickup apparatus,
   wherein the eyepiece detection sensor is disposed on the display unit,
   wherein the display unit is disposed on a rear surface of the image pickup apparatus, wherein the eyepiece detection sensor is disposed at a position along a rotation axis of the hinge mechanism, and wherein the eyepiece detection sensor is disposed at a position deviated from a position at which the electronic viewfinder is able to be detected when the display is rotated by the hinge mechanism.

2. The image pickup apparatus according to claim 1, wherein a detecting direction of the eyepiece detection sensor is a direction intersecting with a display surface of the display.

3. An image pickup apparatus including an electronic viewfinder for viewing an image through an eyepiece and a display unit provided with a display on which the image is displayed, the image pickup apparatus comprising:

an eyepiece detection sensor configured to detect a face of a user and determine whether an eye of the user approaches the electronic viewfinder; and at least one processor and/or a circuit configured to function as a control unit that selectively controls the electronic viewfinder and the display according to an eye detection result by the eyepiece detection sensor, wherein the eyepiece detection sensor is disposed on the display unit, wherein the display unit includes a bezel disposed on a side opposite to a display surface of the display, and the hinge mechanism has a rotation axis placed outside the bezel and disposed within a thickness range of the display.

4. An image pickup apparatus including an electronic viewfinder for viewing an image through an eyepiece and a display unit provided with a display on which the image is displayed, the image pickup apparatus comprising:

an eyepiece detection sensor configured to detect a face of a user and determine whether an eye of the user approaches the electronic viewfinder; and at least one processor and/or a circuit configured to function as a control unit that selectively controls the electronic viewfinder and the display according to an eye detection result by the eyepiece detection sensor, wherein the eyepiece detection sensor is disposed on the display unit, wherein the eyepiece detection sensor is disposed between a center of the image pickup apparatus and a range that specifies the electronic viewfinder.

* * * * *